United States Patent
Chen et al.

(10) Patent No.: US 7,149,527 B2
(45) Date of Patent: Dec. 12, 2006

(54) EFFICIENT AND STABLE RADIO RESOURCE ALLOCATION

(75) Inventors: Lan Chen, Yokohama (JP); Narumi Umeda, Yokohama (JP); Yasushi Yamao, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 562 days.

(21) Appl. No.: 09/966,087

(22) Filed: Oct. 1, 2001

(65) Prior Publication Data

US 2002/0055360 A1    May 9, 2002

(30) Foreign Application Priority Data

Oct. 2, 2000    (JP)    ............... 2000-302636

(51) Int. Cl.
*H04Q 7/20*    (2006.01)
(52) U.S. Cl. .................. 455/452.1; 455/450; 370/329; 370/341; 370/437
(58) Field of Classification Search .................. 455/62, 455/63.1, 63.2, 63.3, 63.4, 452.1, 452.2, 455/450, 464, 509; 370/337, 347, 368, 328, 370/329, 336, 341, 431, 437
See application file for complete search history.

(56) References Cited

U.S. PATENT DOCUMENTS

| | | | | |
|---|---|---|---|---|
| 5,115,309 A | * | 5/1992 | Hang | 348/388.1 |
| 5,910,953 A | * | 6/1999 | Inata | 370/395.51 |
| 6,016,311 A | * | 1/2000 | Gilbert et al. | 370/280 |
| 6,201,972 B1 | * | 3/2001 | Hamabe | 455/450 |
| 6,353,598 B1 | * | 3/2002 | Baden et al. | 370/280 |
| 6,463,295 B1 | * | 10/2002 | Yun | 455/522 |
| 6,502,063 B1 | * | 12/2002 | Eriksson et al. | 702/190 |
| 6,611,509 B1 | | 8/2003 | Hayashi et al. | |
| 6,611,695 B1 | * | 8/2003 | Periyalwar | 455/450 |
| 6,650,630 B1 | * | 11/2003 | Haartsen | 370/345 |
| 6,665,518 B1 | * | 12/2003 | Courtney et al. | 455/12.1 |
| 6,707,798 B1 | * | 3/2004 | Klein et al. | 370/280 |
| 6,741,579 B1 | | 5/2004 | Choi et al. | |
| 2002/0099844 A1 | * | 7/2002 | Baumann et al. | 709/232 |

FOREIGN PATENT DOCUMENTS

| | | |
|---|---|---|
| JP | 7-107546 | 4/1995 |
| JP | 7-297829 | 11/1995 |
| JP | 9-121383 | 5/1997 |
| JP | 11-122667 | 4/1999 |
| JP | 11-261544 | 9/1999 |
| JP | 11-285059 | 10/1999 |
| KR | 2001-0027939 | 4/2001 |
| WO | WO 98/59441 | 12/1998 |
| WO | WO 99/60742 | 11/1999 |

* cited by examiner

*Primary Examiner*—William Trost
*Assistant Examiner*—James D. Ewart
(74) *Attorney, Agent, or Firm*—Oblon, Spivak, McClelland, Maier & Neustadt, P.C.

(57) ABSTRACT

A method of allocating radio resources, in a base station, to the base station and a mobile station, comprising the steps of obtaining a ratio between traffic of uplink for transmission from the mobile station to the base station and traffic of downlink for transmission from the base station to the mobile station, and allocating the radio resources to the uplink and the downlink according to the obtained ratio.

6 Claims, 12 Drawing Sheets

|  | MONDAY | TUESDAY | WEDNESDAY | THURSDAY | FRIDAY | SATURDAY | SUNDAY |
|---|---|---|---|---|---|---|---|
| 0:00~1:00 | 0.71 | 0.72 | 0.74 | 0.70 | 0.72 | 0.78 | 0.80 |
| 1:00~2:00 | 0.70 | 0.71 | 0.72 | 0.65 | 0.71 | 0.78 | 0.79 |
| 2:00~3:00 | 0.55 | 0.56 | 0.55 | 0.54 | 0.70 | 0.75 | 0.78 |
| 3:00~4:00 | 0.52 | 0.53 | 0.51 | 0.52 | 0.65 | 0.70 | 0.74 |
| 4:00~5:00 | 0.50 | 0.51 | 0.50 | 0.51 | 0.60 | 0.65 | 0.70 |
| 5:00~6:00 | 0.50 | 0.51 | 0.50 | 0.50 | 0.56 | 0.58 | 0.60 |
| 6:00~7:00 | 0.51 | 0.52 | 0.51 | 0.52 | 0.56 | 0.58 | 0.58 |
| 7:00~8:00 | 0.53 | 0.54 | 0.53 | 0.55 | 0.55 | 0.58 | 0.58 |
| 8:00~9:00 | 0.55 | 0.55 | 0.56 | 0.57 | 0.56 | 0.53 | 0.52 |
| 9:00~10:00 | 0.52 | 0.53 | 0.52 | 0.54 | 0.52 | 0.51 | 0.51 |
| 10:00~11:00 | 0.52 | 0.53 | 0.52 | 0.54 | 0.52 | 0.51 | 0.51 |
| 11:00~12:00 | 0.51 | 0.51 | 0.51 | 0.52 | 0.51 | 0.51 | 0.51 |
| 12:00~13:00 | 0.55 | 0.57 | 0.56 | 0.57 | 0.56 | 0.53 | 0.52 |
| 13:00~14:00 | 0.52 | 0.53 | 0.52 | 0.54 | 0.52 | 0.51 | 0.51 |
| 14:00~15:00 | 0.52 | 0.53 | 0.52 | 0.54 | 0.52 | 0.51 | 0.51 |
| 15:00~16:00 | 0.52 | 0.53 | 0.52 | 0.54 | 0.52 | 0.51 | 0.51 |
| 16:00~17:00 | 0.55 | 0.57 | 0.56 | 0.57 | 0.56 | 0.53 | 0.52 |
| 17:00~18:00 | 0.58 | 0.59 | 0.58 | 0.58 | 0.59 | 0.60 | 0.61 |
| 18:00~19:00 | 0.70 | 0.71 | 0.72 | 0.65 | 0.71 | 0.78 | 0.79 |
| 19:00~20:00 | 0.71 | 0.72 | 0.74 | 0.70 | 0.72 | 0.78 | 0.80 |
| 20:00~21:00 | 0.72 | 0.73 | 0.75 | 0.73 | 0.76 | 0.80 | 0.81 |
| 21:00~22:00 | 0.73 | 0.74 | 0.75 | 0.74 | 0.77 | 0.81 | 0.81 |
| 22:00~23:00 | 0.72 | 0.73 | 0.75 | 0.73 | 0.76 | 0.80 | 0.81 |
| 23:00~24:00 | 0.71 | 0.72 | 0.74 | 0.70 | 0.72 | 0.78 | 0.80 |

EFFICIENT AND STABLE RADIO RESOURCE ALLOCATION

BACKGROUND OF THE INVENTION

1. Field of the Invention

The present invention generally relates to a method of allocating, in a base station apparatus, radio resources for a link between the base station apparatus and a mobile station apparatus, and further relates to the base station apparatus.

2. Description of the Related Art

In audio communication of mobile communications systems, an uplink for carrying audio from a mobile station has traffic substantially the same amount as that of a downlink for transmitting audio to the mobile station. Radios resources such as frequency bands used in the frequency domain duplex (FDD) method or time slots used in the time domain duplex (TDD) method are thus allocated to the uplink and the downlink symmetrically.

In recent years, the proportion of non-audio communication has been on the increase in the mobile communications. It is expected that multi-media services will further develop, providing users with various information services, exchange of email, applications for transmitting information from a user end, etc.

When information traffic of such services and applications is taken into consideration, data delivery from databases accounts for a large proportion of information traffic in the case of information service, so that downlink has a large amount of traffic in the network and radio channels. In the case of information transmission from a user end, on the other hand, an uplink has a heavy traffic. In this manner, non-audio communication such as data and image communication is believed to need an uplink and a downlink that are asymmetric in terms of traffic.

Further, there may be abundant cases in which traffic characteristics differ between an uplink and a downlink depending on the hours. For example, a large number of Web accesses may be made during lunchtime or at night, resulting in an increase of downlink traffic. During the daytime except for lunchtime, a large amount of traffic are used for audio communication and email exchange, so that the traffic of uplinks and downlinks are expected to be more symmetrical compared to during lunchtime or at night. Further, there will be a time when uplink traffic shows a great surge for a certain time period such as in the case of ticket bookings.

If radio resources are symmetrically allocated to a downlink and an uplink as in the case of conventional audio communications despite actual asymmetric traffics between the uplink and the downlink, there will be excess resources in one link if the allocation is made to match the greater one of the two traffics, or there will be a shortage of resources in one link if the allocation is made to match the smaller one of the two traffics. In this manner, efficient information transfer cannot be made, resulting in a decrease of user satisfaction.

In the FDD method, for example, frequency bands of an uplink and a downlink are fixed to an identical bandwidth, so that uplink traffic and downlink traffic cannot be made asymmetrical. In the TDD method, there is a technique that changes the boundaries of uplink slots and downlink slots in response to a ratio between the uplink traffic and the downlink traffic that are generated at a particular instant. This technique is lacking in stability, and ends up providing a reduction in usage efficiency if it cannot closely follow the traffic changes.

Accordingly, there is a need for a method of allocating radio resources and a base station apparatus using such a method where the method is efficient, flexible, and stable.

SUMMARY OF THE INVENTION

It is a general object of the present invention to provide a method and an apparatus that substantially obviate one or more of the problems caused by the limitations and disadvantages of the related art.

It is another and more specific object of the present invention to provide a need for a method of allocating radio resources and a base station apparatus using such a method where the method is efficient, flexible, and stable.

In order to achieve the above objects according to the present invention, a method of allocating radio resources, in a base station, to the base station and a mobile station includes the steps of obtaining a ratio between traffic of uplink for transmission from the mobile station to the base station and traffic of downlink for transmission from the base station to the mobile station such that the ratio reflects empirical data, and allocating the radio resources to the uplink and the downlink according to the obtained ratio.

In the radio-resource allocation method as described above, radio resources are allocated to the uplink and the downlink in an asymmetrical manner in accordance with the traffic amount of the uplink and the traffic amount of the downlink based on empirical data, thereby achieving efficient and flexible radio resource application. Since the allocation of radio resources is not based on the instantaneous traffic amounts of the uplink and the downlink as in the related art, there is no need to closely follow traffic changes, so that a stable radio resource allocation can be attained.

According to one aspect of the present invention, the method as described above further includes a step of dividing time into a plurality of time periods, wherein the step of obtaining a ratio obtains the ratio with respect to each one of the time periods by deriving the ratio from traffic of the uplink of a corresponding time period and traffic of the downlink of the corresponding time period. Since there is empirical evidence that the ratio between the uplink traffic amount and the downlink traffic amount is correlated to time periods, this method can attain proper radio resource allocation that takes into account traffic characteristics dependent on the time periods.

According to one aspect of the present invention, the method as described above is such that the step of obtaining a ratio obtains the ratio by averaging a ratio between traffic of the uplink and traffic of the downlink over a first predetermined period with respect to each one of the time periods. If traffic exhibits a great surge for a short duration, it is not proper to allocate radio resources in accordance with such a surge. By taking into account an average traffic over a predetermined period, it becomes possible to attain proper radio resource allocation that reduces an undesirable effect of a sudden traffic change.

According to one aspect of the present invention, the method as described above further includes the steps of obtaining an instantaneous ratio between traffic of the uplink and traffic of the downlink for a second predetermined period immediately preceding a present instant where the second predetermined period is shorter than the first predetermined period, and obtaining a weighted average of the ratio averaged over the first predetermined period and the instantaneous ratio by weighting the ratios with respective weighting factors, wherein the step of allocating the radio resources allocates the radio resources to the uplink and the downlink according to the weighted average. This achieves proper radio resource allocation by combining an average traffic over the predetermined time period and the instantaneous traffic over a shorter time period immediately preceding a present instant.

According to one aspect of the present invention, the method as described above further includes a step of transmitting, to the mobile station, information about the radio resources with respect to at least one of the uplink and the downlink. In this case, the mobile station apparatus can learn the information about the radio resources, thereby attending control of radio transmission/reception.

According to one aspect of the present invention, the method as described above further includes a step of allocating transmission power according to communication quality required for the uplink and the downlink. In this case, transmission power is allocated such as to satisfy the requirements of communication quality for the uplink and the downlink.

Further, the present invention provides a base station apparatus that is designed to perform the radio resource allocation method as described above.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

In what follows, either the frequency bands used in the frequency domain duplex (FDD) method or the time slots used in the time domain duplex (TDD) method are allocated as radio resources.

Figure 1:
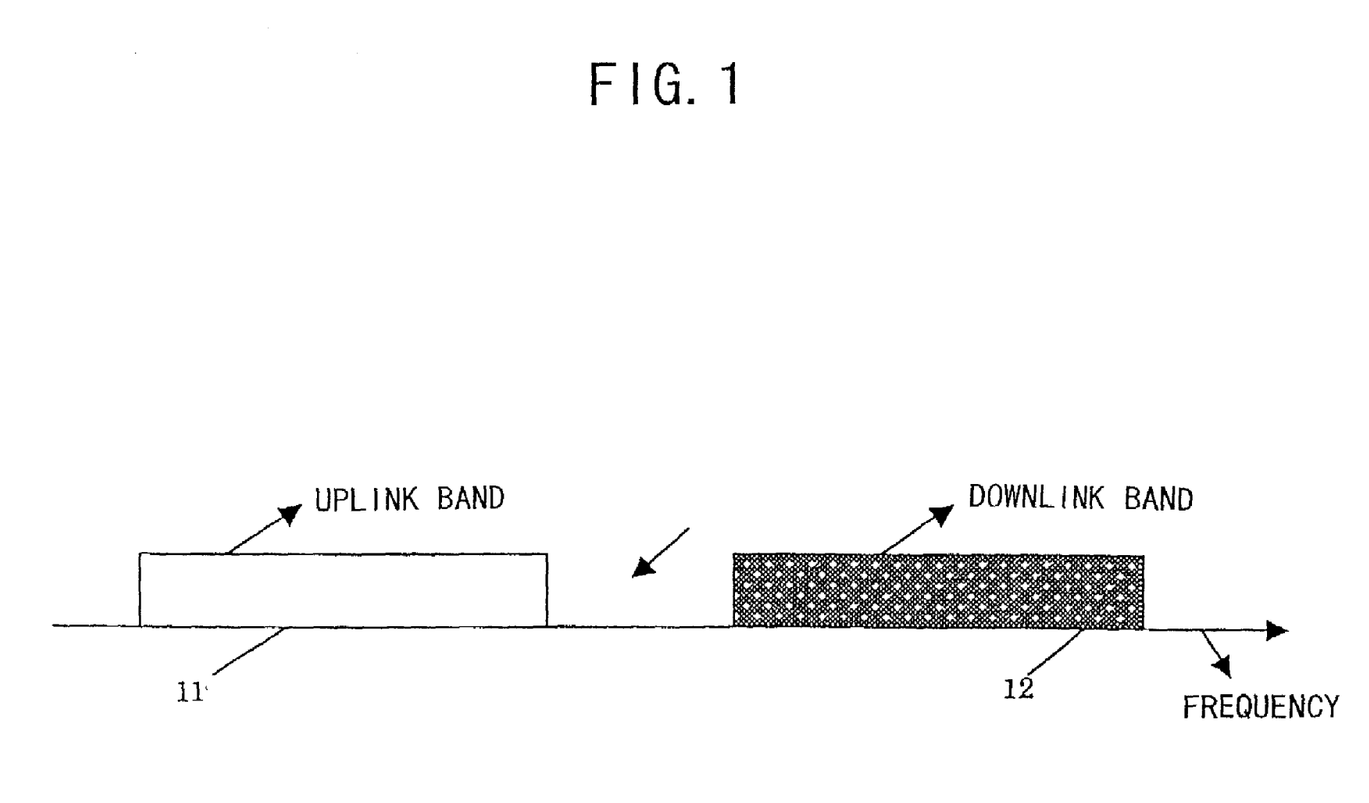
FIG. 1 is a drawing showing a related-art frequency domain allocation in the FDD method.

A first embodiment that allocates frequency bands in the FDD method will be described first. FIG. 1 is a drawing showing a related-art frequency domain allocation in the FDD method. As shown in FIG. 1, the frequency band 11 of an uplink that transfers data from a mobile station to a base station (i.e., the uplink band) has the same bandwidth as the frequency band 12 of a down link that carries data from the base station to the mobile station (i.e., the downlink band).

Figure 2A:
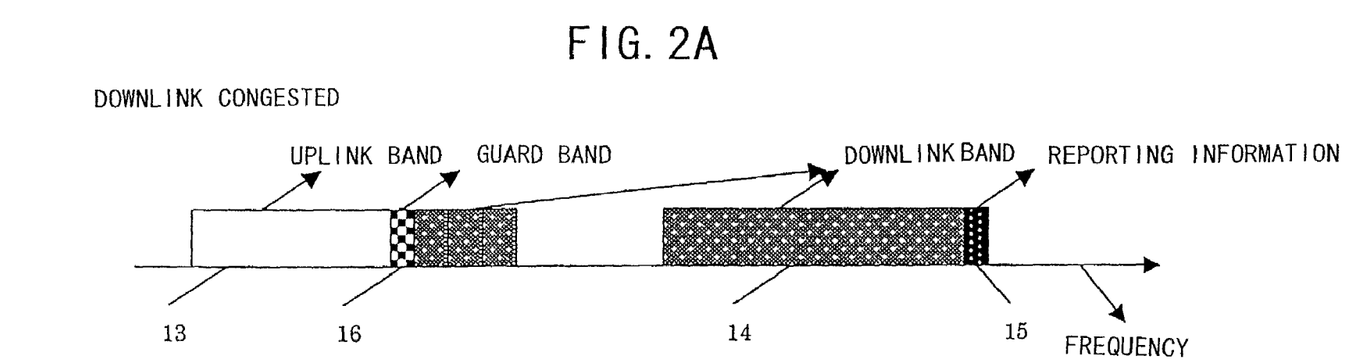
FIGS. 2A and 2B are drawings showing a frequency domain allocation according to the first embodiment.
Figure 2B:
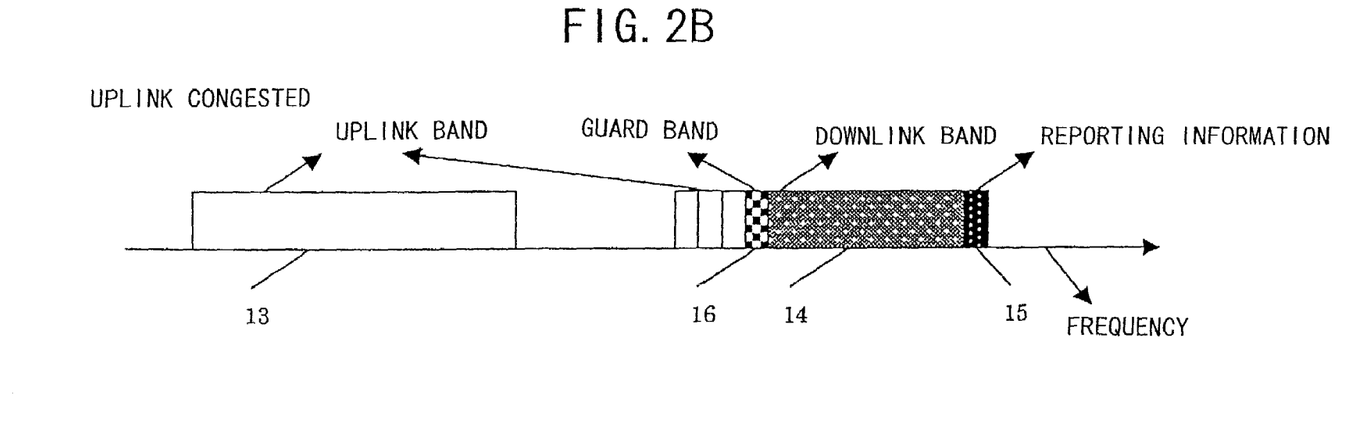

FIGS. 2A and 2B are drawings showing a frequency domain allocation according to the first embodiment. As shown in FIG. 2A or 2B, part or all of the uplink band is provided for use as downlink bands, depending on the traffic of an uplink and the traffic of a downlink. Also, part or all of the downlink band is provided as usable for the uplink band. As shown in FIG. 2A, for example, when the downlink is congested, i.e., when the downlink traffic is great, part of an uplink band 13 is used as an extension of a downlink band 14. As shown in FIG. 2B, on the other hand, when the uplink is congested, i.e., when the uplink traffic is great, part of the downlink band 14 is used as an extension of the uplink band 13.

The mobile station generally employs a band-pass filter in order to cut radio transmission and reception except for the frequency bands that are used by the mobile station. Because of actual characteristics of the band-bass filter that are different from ideal characteristics, a guard band 16 is used at the border between the uplink band and the downlink band. Further, part of the downlink band is used for the purpose of reporting. The base station uses this reporting-purpose downlink band (downlink reporting channel) 15 to inform the mobile station of information about the uplink band (e.g., the number of channels and a channel number). If the total number of channels of the uplink band and the downlink band is constant, and if the mobile station knows this total number, the base station may only report the number of uplink band channels to the mobile station. In this case, further, the base station may inform the mobile station of the number of downlink band channels rather than the number of uplink band channels. If the total number of uplink band channels and the downlink band channels is not constant but varies, the base station may report both the number of uplink band channels and the number of downlink band channels.

Figure 3:
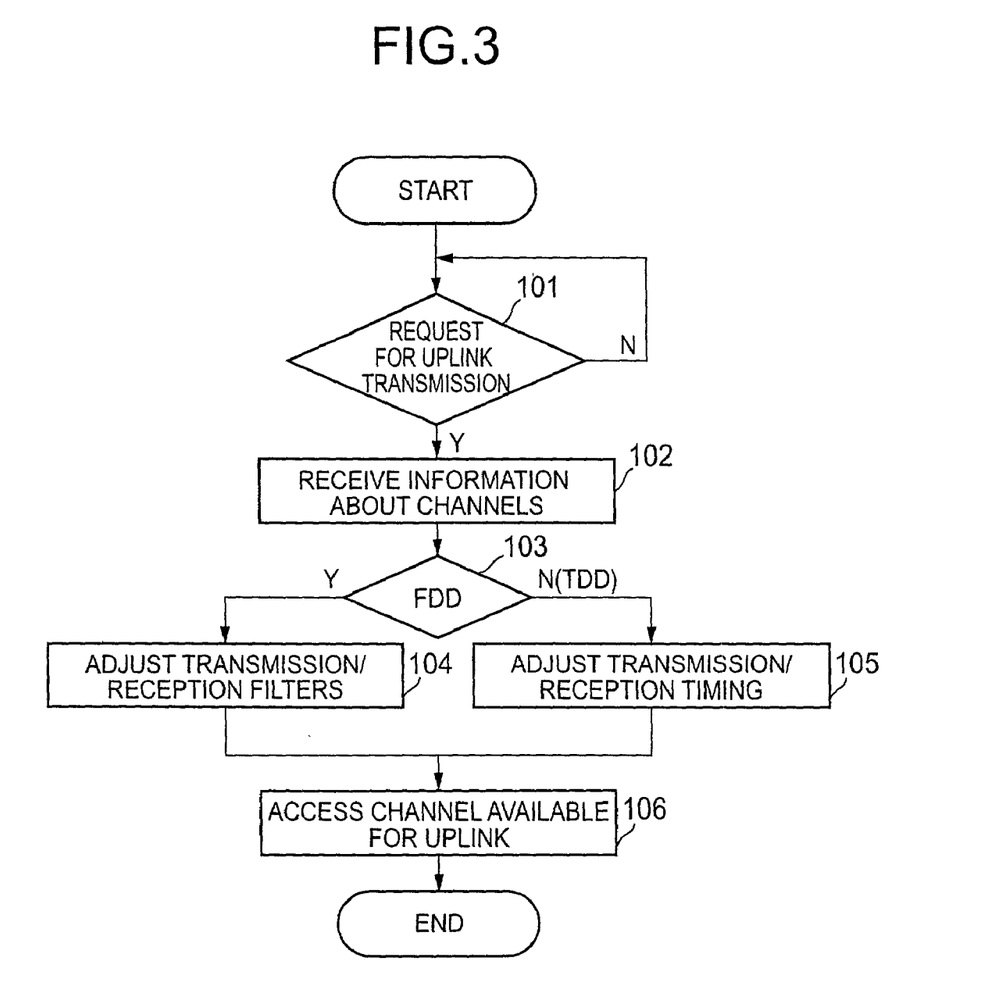
FIG. 3 is a flowchart showing an operation of a mobile station according to the first embodiment.

FIG. 3 is a flowchart showing an operation of a mobile station according to the first embodiment. At step 101, a mobile station checks whether a request for uplink transmission is made. If the mobile station makes a request for uplink transmission, the base station responds to the request by allocating an uplink band and a downlink band, and uses the downlink reporting channel to transmit information about the uplink band to the mobile station. At step 102, the mobile station receives the signal of the downlink reporting channel, and identifies the numbers of uplink band channels and downlink band channels, etc. At step 103, the mobile station checks whether the communication method is the FDD method. In this example, the communication is carried out by the FDD method, so that the check produces an affirmative decision. At step 104, the mobile station adjusts a transceiver filter internally provided, such that requirements such as the numbers of uplink band channels and downlink band channels allocated by the base station are satisfied. At step 106, the mobile station accesses one of the uplink band channels to transmit data.

FIG. 3 has been described with regard to a case in which the mobile station makes a request for uplink transmission and transmits data to the base station. Even if there is no uplink data transmission, operations the same as those of the step 102 and the following steps are carried out as long as there is downlink data transmission. Namely, if the mobile station receives a signal of the downlink reporting channel, the mobile station identifies the numbers of uplink band channels and downlink band channels based on the received signal. If the communication method is the FDD method, the mobile station adjusts the internally provided transceiver filter such as to reflect the numbers of uplink band channels and downlink band channels allocated by the base station, and receives data.

Figure 4:
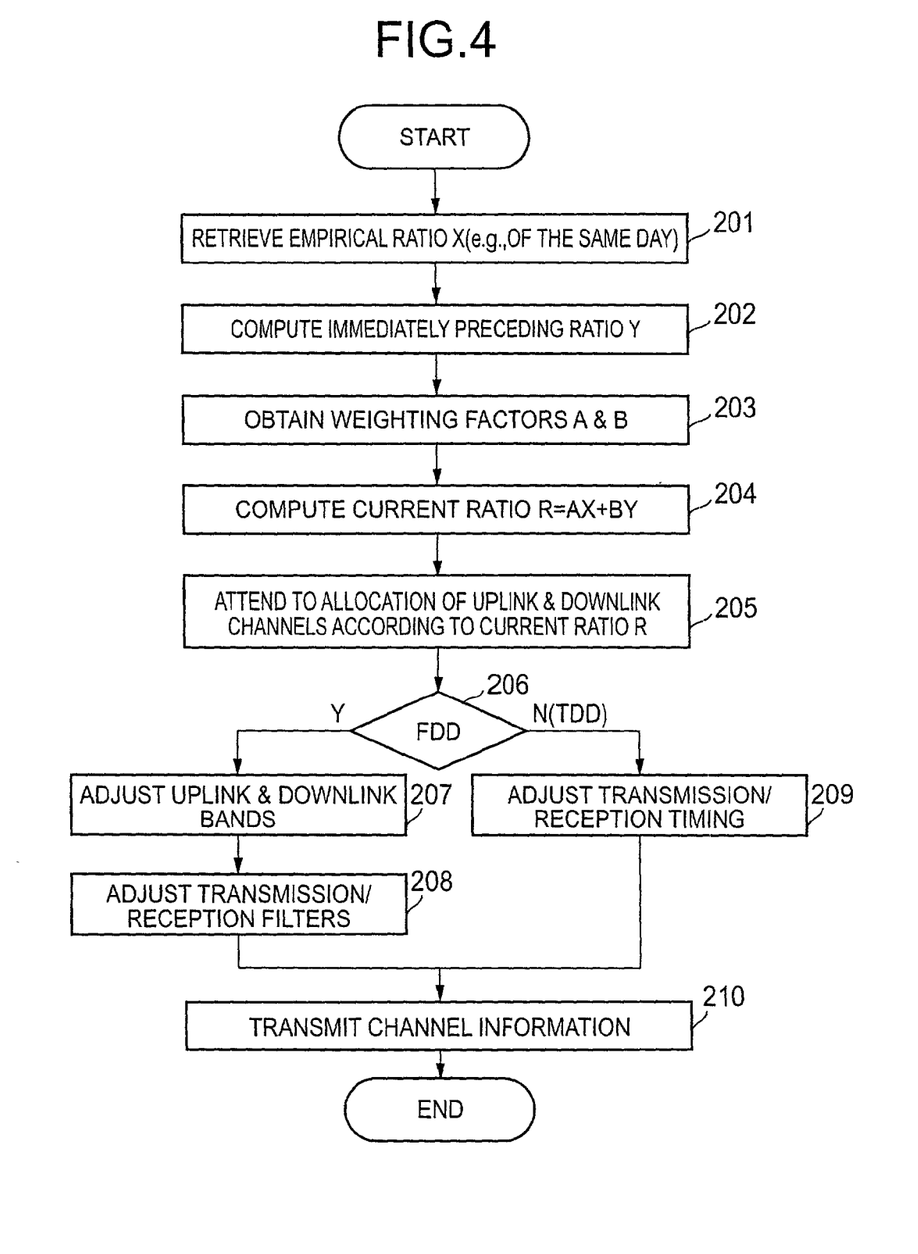
FIG. 4 is a flowchart showing an operation of a base station according to the first embodiment.

FIG. 4 is a flowchart showing an operation of a base station according to the first embodiment. FIG. 4 shows an operation of the base station performed when the base station allocates frequency bands to an uplink and a downlink by calculating a ratio of an uplink traffic to the total uplink and downlink traffic and a ratio of a downlink traffic to the total uplink and downlink traffic. Hereinafter, these ratios are called a current ratio.

The base station divides time into a plurality of time periods such as days, and measures uplink traffic and downlink traffic in each time period. The measured traffics are then recorded. In each time period, the base station calculates an average of a ratio of the uplink traffic to the sum of the uplink traffic and the downlink traffic (hereinafter called an "uplink empirical ratio"), and further calculates an average of a ratio of the downlink traffic to the sum of the uplink traffic and the downlink traffic (hereinafter called an "downlink empirical ratio"). These empirical ratios are consecutively computed, updated, and recorded.

In each time period, further, the base station calculates an average of a ratio of the uplink traffic to the sum of the uplink traffic and the downlink traffic for the duration immediately preceding a present instant and shorter than the duration of empirical ratio measurement. Hereinafter, this average ratio is called an "uplink immediately preceding ratio". By the same token, the base station calculates an average of a ratio of the downlink traffic (hereinafter called a "downlink immediately preceding ratio").

Thereafter, the base station carries out predetermined computations based on the empirical ratios and immediately preceding ratios with respect to each time period, thereby obtaining current ratios. These current ratios are used as ratios of radio resource allocation between the uplink and the downlink. Here, the base station multiplies the empirical ratios and immediately preceding ratios by predetermined weighting factors in order to obtain the current ratios.

As shown in FIG. 4, at step 201, the base station retrieves an empirical ratio X that corresponds to this particular instant. If time is divided into time periods of days, an empirical ratio X of the day of this particular instant is retrieved. At step 202, then, the base station calculates an immediately preceding ratio Y.

At step 203, the base station determines weighting factors A and B. At step 204, the base station obtains a sum of the empirical ratio X multiplied by the weighting factor A and the immediately preceding ratio Y multiplied by the weighting factor B. This sum is a current ratio R. That is, current ratio R = (weighting factor A)(empirical ratio X) +
(weighting factor B)(immediately preceding ratio Y).

Here, the weighting factors A and B are related to each other as: A+B=1. The weighting factors A and B may be determined by each base station independently of others. Here, current ratios, empirical ratios, and immediately preceding ratios are all referred to simply as "ratios", but each include the uplink ratio and the downlink ratio.

There are several ways to determine the weighting factors A and B, depending on patterns of traffic changes. In a base station in which downlink and uplink traffic is volatile or irregular, the empirical ratio X may be made small while enhancing the immediately preceding ratio Y, thereby achieving a more efficient allocation of radio resources. One of the weighting factors A and B may be set to zero, so that the radio resources are allocated based only on the empirical ratio X or only on the immediately preceding ratio Y.

After obtaining the current ratio R as described above, the base station allocates radio resources to the uplink and the downlink based on the current ratio R. At step 205, the base station allocates uplink band channels and downlink band channels as radio resources to the uplink and the downlink. Since the check at step 206 gives an affirmative answer that the communication method is the FDD method, the base station adjusts the bandwidths of the uplink and the downlink at step 207. At step 208, the base station adjusts an internal transceiver filter such that the channel configuration of the allocated uplink band and the downlink band are achieved.

At step 210, the base station uses the downlink reporting channel to transmit information about the channel configuration of the uplink band to the mobile station.

Figure 5:
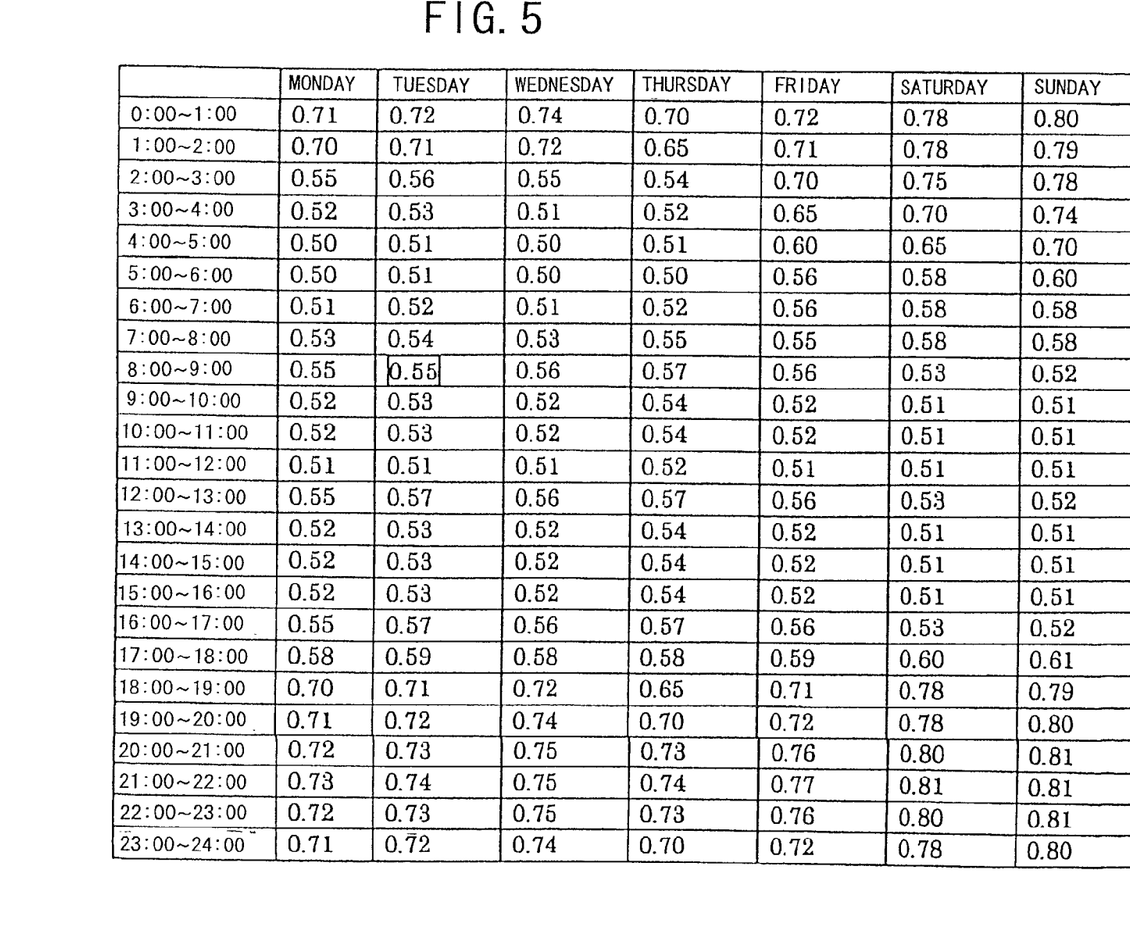
FIG. 5 shows an example of empirical ratios obtained by a base station that measures and averages a ratio of the downlink traffic over one month period with respect to each time period where time is divided by days and hours.
Figure 6:
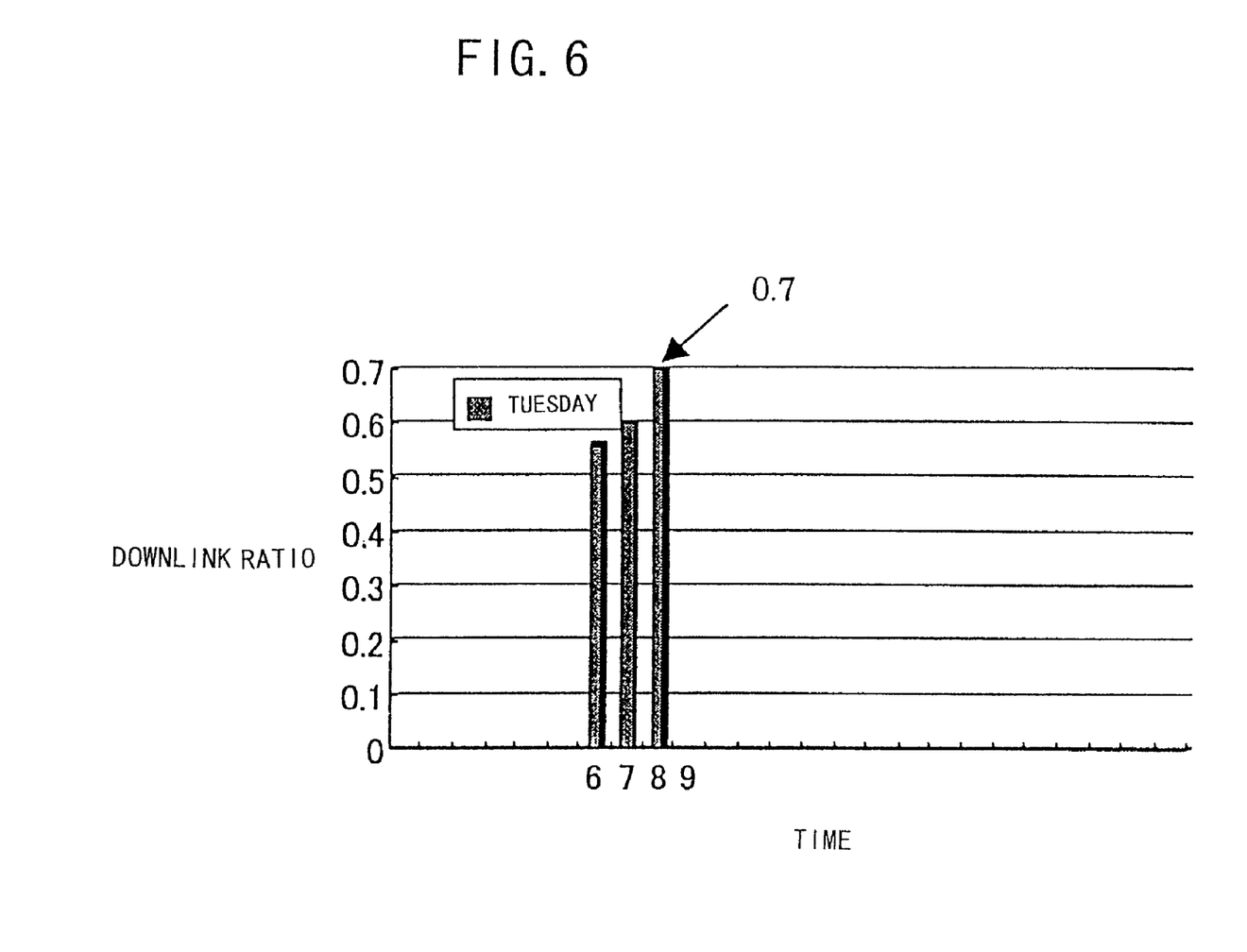
FIG. 6 shows an example of immediately preceding ratios of the downlink traffic for each hour of an immediately preceding three-hour period.

FIG. 5 shows an example of empirical ratios obtained by a base station that measures and averages a ratio of the downlink traffic over one month with respect to each time period where time is divided by days and hours. FIG. 6 shows an example of immediately preceding ratios of the downlink traffic for each hour of an immediately preceding three-hour period.

When the current ratio of 9:00 on Tuesday is to be obtained by using an instantaneous traffic of a preceding hour as an immediately preceding ratio, the ratio of downlink traffic at 8:00 immediately prior to 9:00 is 0.7 as shown in FIG. 6, and the empirical ratio of an 8:00-hour time period (8:00–9:00) of Tuesday is 0.55.

Accordingly, if a weighting factor of 0.5 is given to both the empirical ratio and the immediately preceding ratio, the current ratio of the downlink is computed as 0.625. If the total number of channels is 20, the number of downlink band channels is 12, and the number of uplink band channels is 8, according to the current ratio of the downlink. Namely, two of the ten conventional uplink band channels are used as the downlink band, and the eight remaining channels are used as the uplink band. Further, the ten conventional downlink band channels are all used as the downlink band.

The base station then informs the mobile station of the number of allocated uplink band channels, i.e., 8, by using the downlink reporting channel, and adjusts the internal transceiver filter according to the allocated numbers of uplink band channels and downlink band channels. The mobile station receives the indication of the allocated channel numbers, and adjusts the internal transceiver filter according to the allocated numbers of uplink band channels and downlink band channels, followed by accessing the uplink band channels and starting data transmission.

In this example, the time category is comprised of days and hours, but may be any time periods such as years, months, weeks, and days as long as there is correlation with changes of traffic. time may be divided by such categories as week days, weekend days, days preceding non-business days. In such a case, if a weekday is a holiday and thus a non-business day, category-specific traffic is measured by taking into consideration this fact.

In this embodiment, there may be a case in which communication quality required for the uplink and the downlink are not satisfied after allocating frequency bands to the uplink and the downlink through various computation and data processing. In such a case, the base station may reallocate transmission power by boosting transmission power of uplinks and downlinks of its own cell or reducing transmission power of uplinks and downlinks of other cells. This makes it possible to reduce a bit-error rate and attain high-speed transfer, thereby satisfying the required communication quality.

Further, there may be a case in which actual communication quality far exceeds the communication quality required for the uplink and the downlink after allocating frequency bands to the uplink and the downlink through various computation and data processing This may present a risk of squandering of system capacity. To prevent an excessive reduction in available system capacity, the base station reallocates transmission power by reducing the transmission power of uplinks and downlinks of its own cell, for example.

Reallocation of transmission power in accordance with communication quality required for uplinks and downlinks is quite effective in achieving high quality and high-speed transmission.

Figure 7:
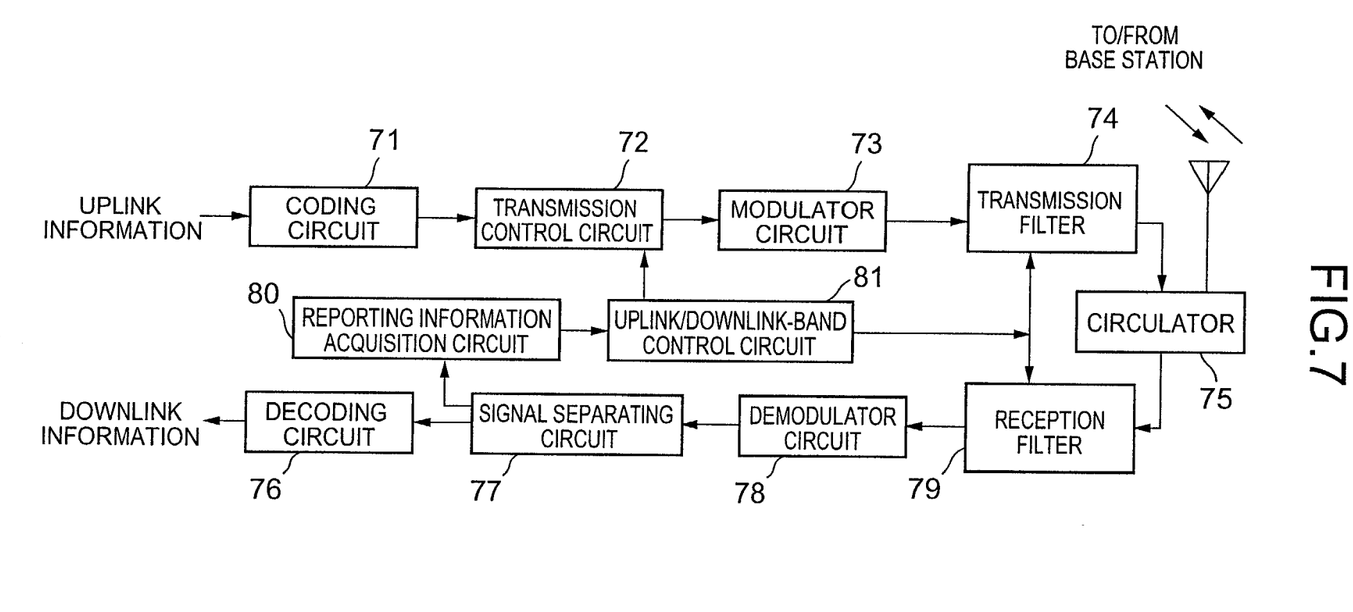
FIG. 7 is a drawing showing a configuration of a mobile station according to the first embodiment.

FIG. 7 is a drawing showing a configuration of a mobile station according to the first embodiment. The mobile station of FIG. 7 includes a coding circuit 71, a transmission control circuit 72, a modulator circuit 73, a transmission filter 74, a circulator 75, a decoding circuit 76, a signal separating circuit 77, a demodulator circuit 78, a reception filter 79, a reporting information acquisition circuit 80, and an uplink/downlink-band control circuit 81.

Figure 8:
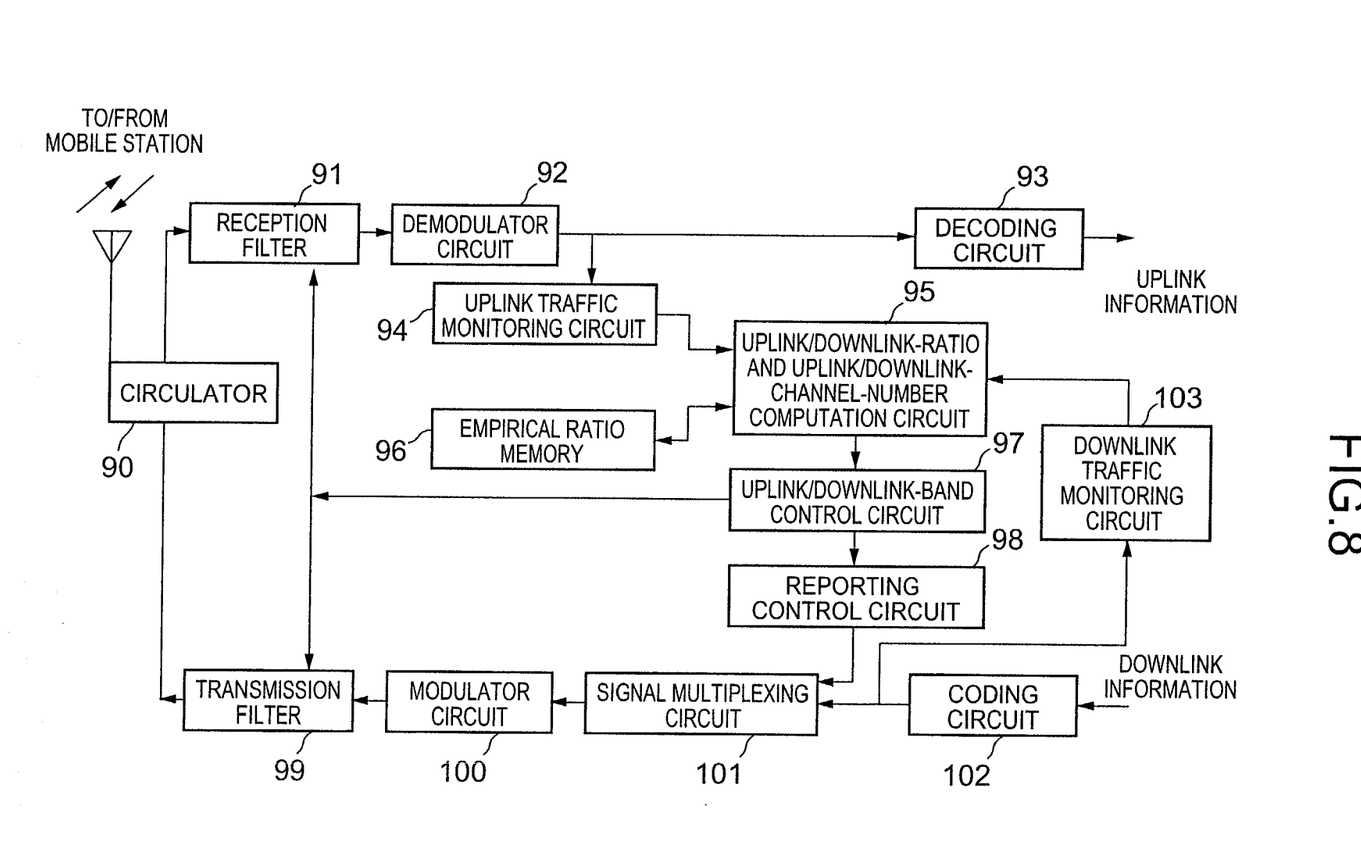
FIG. 8 is a drawing showing a configuration of a base station according to the first embodiment.

FIG. 8 is a drawing showing a configuration of a base station according to the first embodiment. The base station of FIG. 8 includes a circulator 90, a reception filter 91, a demodulator circuit 92, a decoding circuit 93, an uplink traffic monitoring circuit 94, an uplink/downlink-ratio and uplink/downlink-channel-number computation circuit 95, an empirical ratio memory 96, an uplink/downlink-band control circuit 97, a reporting control circuit 98, a transmission filter 99, a modulator circuit 100, a signal multiplexing circuit 101, a coding circuit 102, and a downlink traffic monitoring circuit 103.

In the following, operations of the mobile station and the base stations will be described with reference to FIG. 7 and FIG. 8. When a need arises to transmit information from the mobile station to the base station through an uplink, information to be transmitted is input to the transmission control circuit 72 after relevant processing such as error correction coding is performed by the coding circuit 71 of the mobile station. The information to be transmitted is then transmitted to the base station as uplink signals under the control of the transmission control circuit 72 after passing through the modulator circuit 73, the transmission filter 74, and the circulator 75.

Reception signals from the base station are demodulated by the demodulator circuit 78, and, then, the signal separating circuit 77 separates a reporting information component as shown in FIGS. 2A and 2B. The reporting information component is then supplied to the transmission control circuit 72 via the reporting information acquisition circuit 80 and the uplink/downlink-band control circuit 81. The transmission control circuit 72 controls channel access within the uplink band specified by this reporting information. The uplink/downlink-band control circuit 81 controls the filter parameters of the transmission filter 74 and the reception filter 79 according to the number of uplink band channels specified by the reporting information that is obtained by the reporting information acquisition circuit 80. The reception signals (downlink signals) except for the reporting information pass through the signal separating circuit 77 and the decoding circuit 76 to become downlink information.

Uplink signals received by the base station pass through the reception filter 91, the demodulator circuit 92, and the decoding circuit 93 to become uplink information. The output of the demodulator circuit 92 is branched and fed into the uplink traffic monitoring circuit 94, which monitors the amount of uplink traffic in terms of an uplink band channel occupancy or the like. The monitored amount of uplink traffic is supplied to the uplink/downlink-ratio and uplink/downlink-channel-number computation circuit 95. The downlink traffic monitoring circuit 103 receives the output of the coding circuit 102, and monitors the amount of downlink traffic in the same manner as does the uplink traffic monitoring circuit 94. The monitored amount of downlink traffic is supplied to the uplink/downlink-ratio and uplink/downlink-channel-number computation circuit 95. The uplink/downlink-ratio and uplink/downlink-channel-number computation circuit 95 performs operation as follows:

(1) obtaining an uplink immediately preceding ratio and a downlink immediately preceding ratio;
(2) retrieving an empirical ratio from the empirical ratio memory 96 to obtain a current ratio;
(3) obtaining the numbers of the uplink band and the downlink band according to the current ratio, and ordering the uplink/downlink-band control circuit 97 to change channel numbers; and
(4) updating empirical ratios. That is, empirical ratios are retrieved from the empirical ratio memory 96 at predetermined intervals, and weighted averages of the empirical ratios and immediately preceding ratios are obtained by weighting respective ratios according to the numbers of samples, followed by storing the obtained averages as new empirical ratios in the empirical ratio memory 96.

The uplink/downlink-band control circuit 97 controls parameters of the reception filter 91 and the transmission filter 99 according to the numbers of uplink band channels and downlink band channels obtained by the uplink/downlink-ratio and uplink/downlink-channel-number computation circuit 95, and supplies the number of uplink band channels and channel identification numbers or the like to the signal multiplexing circuit 101 via the reporting control circuit 98. These signals input into the signal multiplexing circuit 101 are multiplexed by the signal multiplexing circuit 101 with the downlink information supplied from the coding circuit 102. The multiplexed signals are then transmitted to the mobile station via the modulator circuit 100, the transmission filter 99, and the circulator 90.

In what follows, a second embodiment that allocates time slots in the TDD method will be described.

Figure 9:
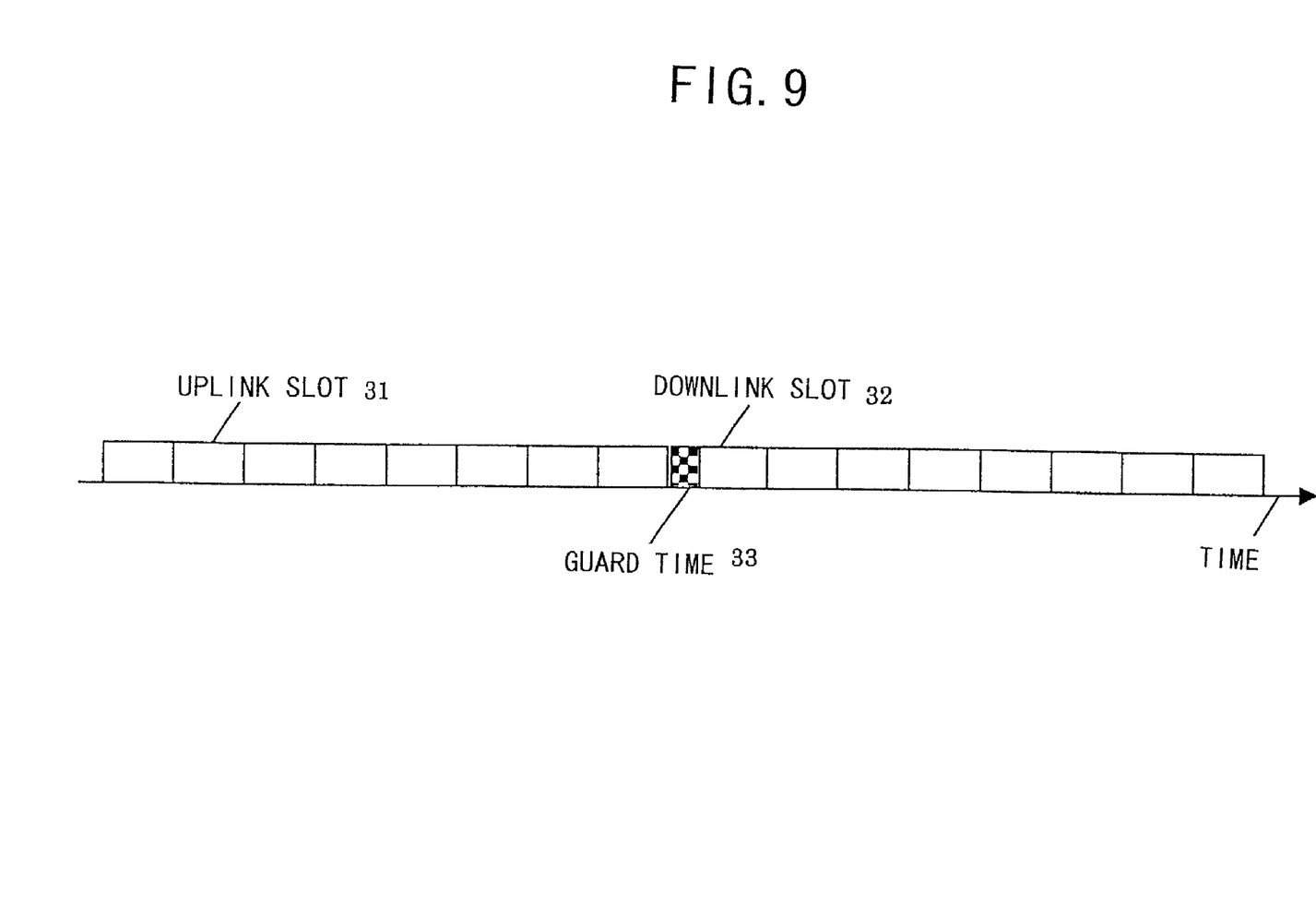
FIG. 9 is a drawing showing a configuration of time slots allocated by a related-art TDD method.

FIG. 9 is a drawing showing a configuration of time slots allocated by a related-art TDD method. As shown in FIG. 9, uplink time slots 31 (hereinafter referred to simply as uplink slots) transmitted from the mobile station to the base station and downlink time slots 32 (hereinafter referred to simply as downlink slots) transmitted from the base station to the mobile station are allocated in a symmetric form, with a guard time 33 provided between the uplink slots and the downlink slots.

Figure 10A:
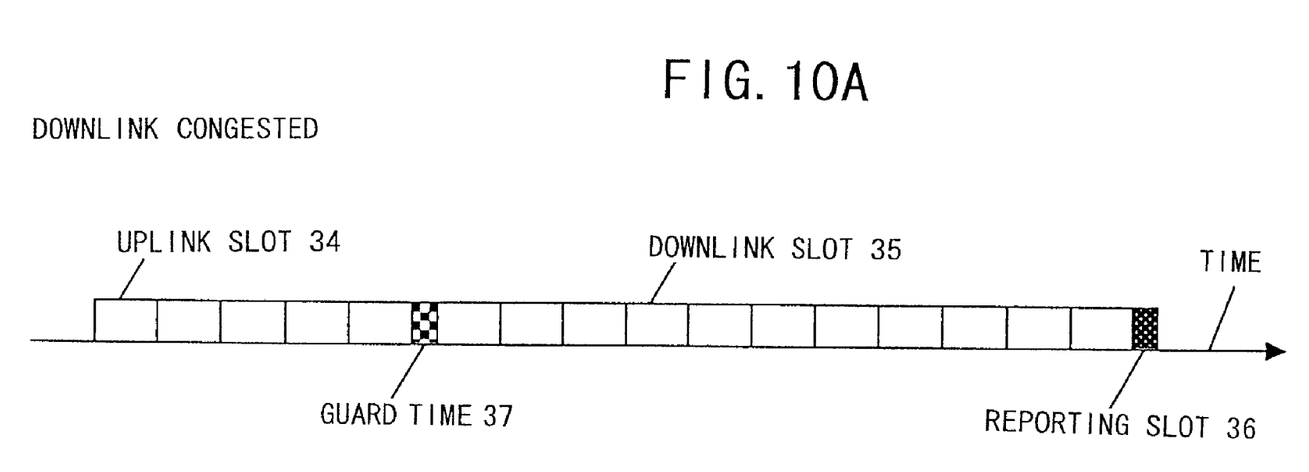
FIGS. 10A and 10B are a drawing showing a configuration of time slots allocated according to a second embodiment.
Figure 10B:
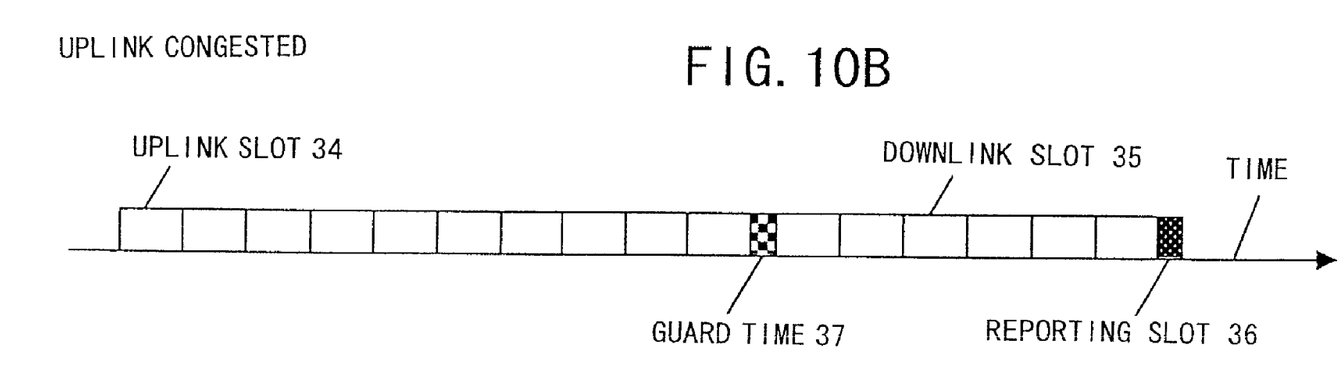

FIGS. 10A and 10B are a drawing showing a configuration of time slots allocated according to the second embodiment. As shown in FIG. 10A or 10B, part of all of the uplink slots may be used as downlink slots or part or all of the downlink slots may be used as uplink slots in accordance with the traffic amount of the uplink and the downlink. As shown in FIG. 10A, for example, when the downlink is congested, i.e., when the amount of downlink traffic is large, part of the uplink slots 34 are used as the downlink slots 35. As shown in FIG. 10B, on the other hand, when the uplink is congested, i.e., when the amount of uplink traffic is large, part of the downlink slots 35 are used as the uplink slots 34. As shown in FIGS. 10A and 10B, a reporting slot 36 serving as a downlink reporting channel is allocated alongside the downlink slots 35. By using the reporting slot 36, the base station informs the mobile station of information about uplink and downlink slots (e.g., the total number of uplink slots and downlink slots). If the total number of uplink slots and downlink slots is fixed, and is known to the mobile station in advance, only one of the number of uplink slots and the number of the downlink slots may be reported to the mobile station.

A procedure of allocating time slots in the TDD method is substantially the same as the procedure of allocating frequency bands in the FDD method. In the following, only the points where there is a difference will be described.

Operations of the mobile station are shown in the flowchart of the mobile station of FIG. 3. As shown in the flowchart, the mobile station checks at step 101 whether a request for uplink transmission is made. At step 102, the motile station receives signals of the reporting slot, and learns the numbers of uplink slots and downlink slots or the like. At step 103, the mobile station checks whether the communication method is the FDD method. Since the communication method is the TDD method in this case, a negative check result is given, so that the mobile station adjusts transmission/reception timing such as to satisfy the requirements of the numbers of uplink slots and downlink slots allocated by the base station. At step 106, the mobile station accesses one of the uplink slots to transmit data.

Operations of the base station are shown in the flowchart of the base station of FIG. 4. Procedures of steps 201 through 204 are the same as those of allocating a frequency band in the FDD method, and a description thereof will be omitted.

After the current ratio R is computed at step 204, the base station allocates radio resources to the uplink and the downlink such as to make them reflect the current ratio R. Namely, at step 205, the base station allocates uplink slots and downlink slots as radio resources to the uplink and the downlink, respectively. In response to a negative check result given at step 206 indicating the use of the TDD method, the base station adjusts transmission/reception timing at step 209. At step 210, the base station informs the mobile station of the numbers of uplink slots and downlink slots by use of the reporting slot.

Figure 11:
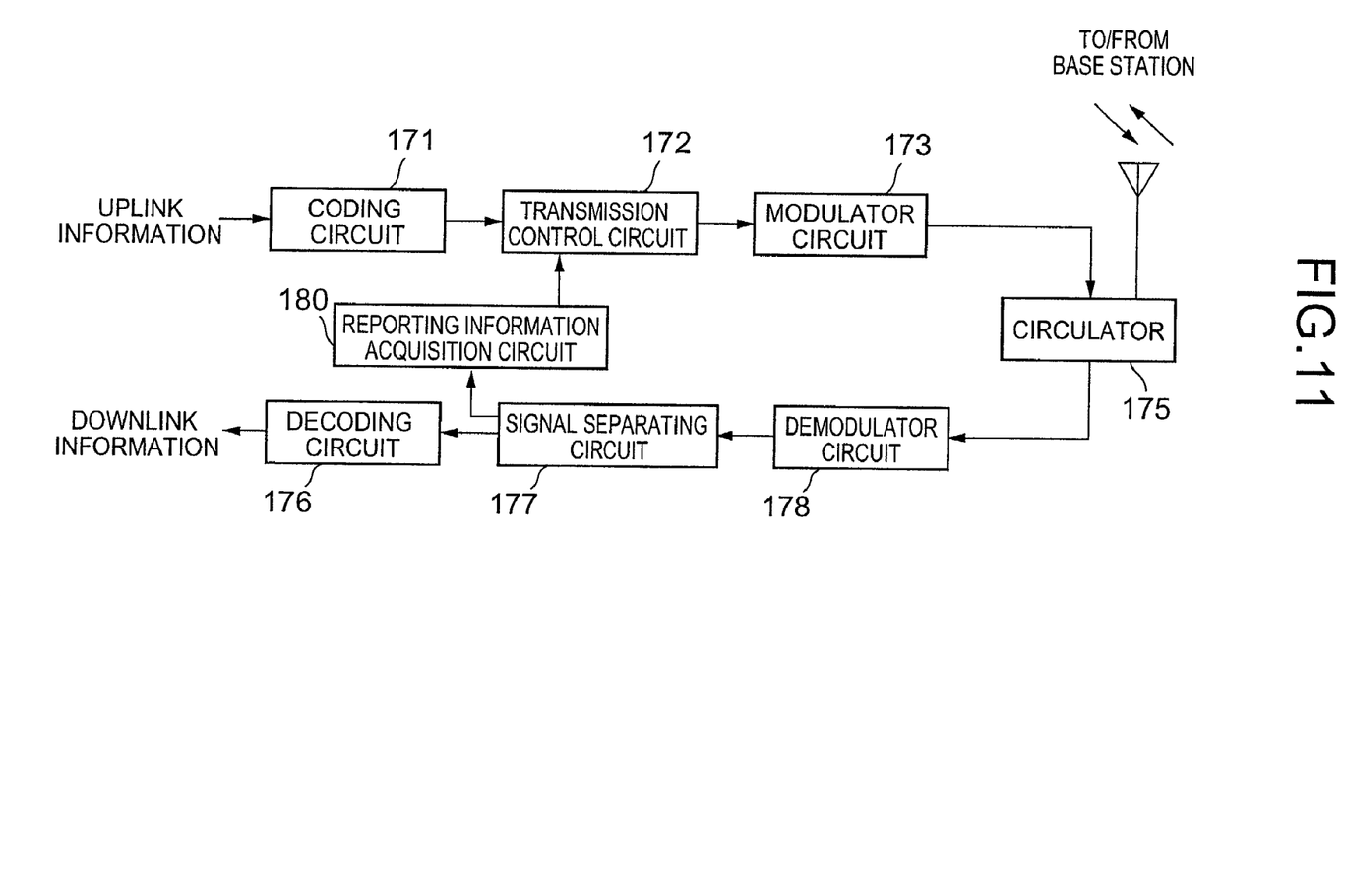
FIG. 11 is a drawing showing a configuration of a mobile station according to the second embodiment.

FIG. 11 is a drawing showing a configuration of a mobile station according to the second embodiment. The mobile station of FIG. 11 includes a coding circuit 171, a transmission control circuit 172, a modulator circuit 173, a circulator 175, a decoding circuit 176, a signal separating circuit 177, a demodulator circuit 178, and a reporting information acquisition circuit 180.

Figure 12:
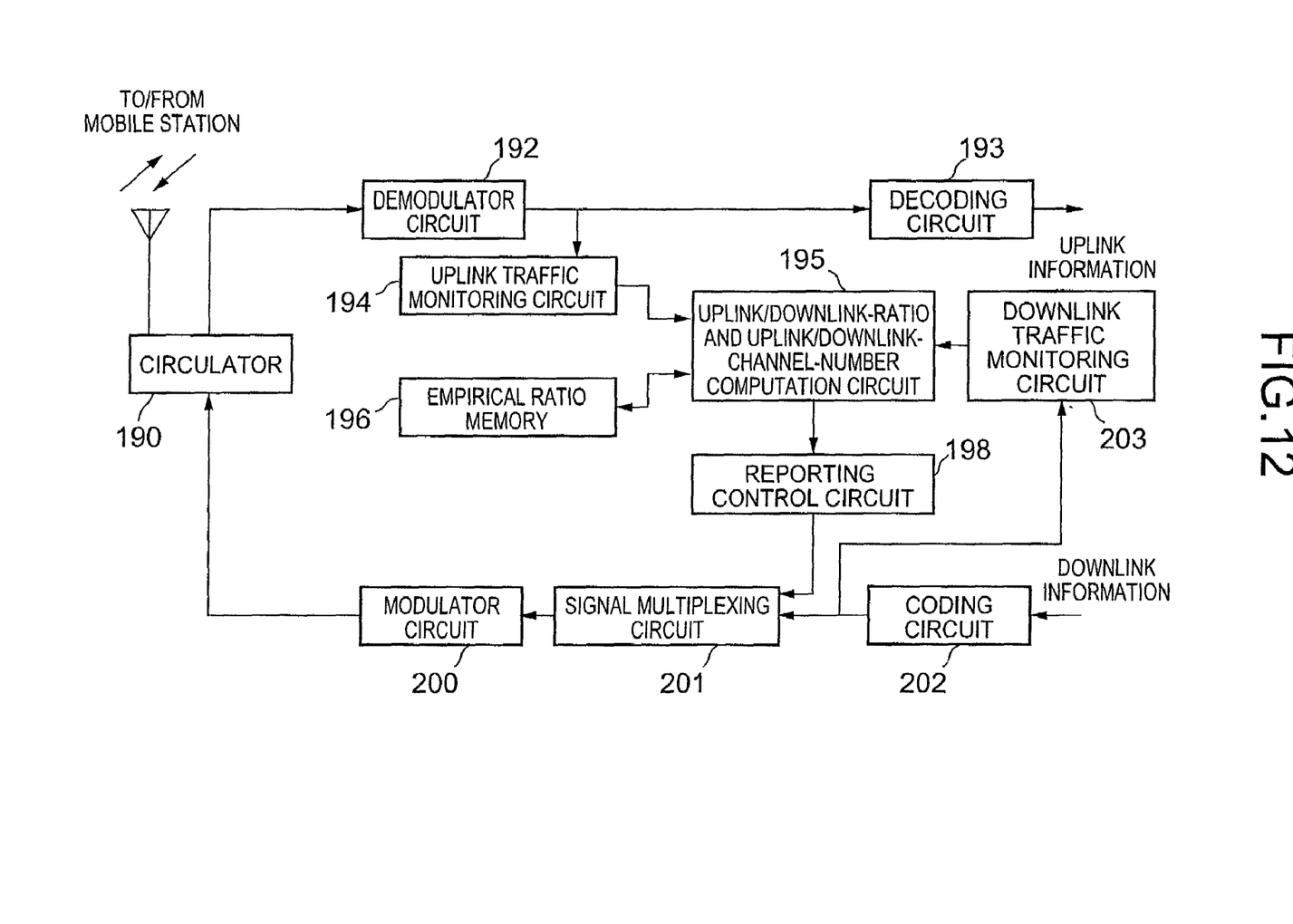
FIG. 12 is a drawing showing a configuration of a base station according to the second embodiment.

FIG. 12 is a drawing showing a configuration of a base station according to the second embodiment. The base station of FIG. 12 includes a circulator 190, a demodulator circuit 192, a decoding circuit 193, an uplink traffic monitoring circuit 194, an uplink/downlink-ratio and uplink/downlink-channel-number computation circuit 195, an empirical ratio memory 196, a reporting control circuit 198, a modulator circuit 200, a signal multiplexing circuit 201, a coding circuit 202, and a downlink traffic monitoring circuit 203.

In the following, operations of the mobile station and the base stations will be described with reference to FIG. 11 and FIG. 12. When a need arises to transmit information from the mobile station to the base station through an uplink, information to be transmitted is input to the transmission control circuit 172 after relevant processing such as error correction coding is performed by the coding circuit 171 of the mobile station. The information to be transmitted is then transmitted to the base station as uplink signals under the control of the transmission control circuit 172 after passing through the modulator circuit 173 and the circulator 175.

Reception signals from the base station are demodulated by the demodulator circuit 178, and, then, the signal separating circuit 177 separates a reporting information component as shown in FIGS. 2A and 2B. The reporting information component is then supplied to the transmission control circuit 172 via the reporting information acquisition circuit 180. The transmission control circuit 172 controls access to uplink slots specified by this reporting information. The reception signals (downlink signals) except for the reporting information pass through the signal separating circuit 177 and the decoding circuit 176 to become downlink information.

Uplink signals received by the base station pass through the demodulator circuit 192 and the decoding circuit 193 to become uplink information. The output of the demodulator circuit 192 is branched and fed into the uplink traffic monitoring circuit 194, which monitors the amount of uplink traffic in terms of an uplink slot occupancy or the like. The monitored amount of uplink traffic is supplied to the uplink/downlink-ratio and uplink/downlink-channel-number computation circuit 195. The downlink traffic monitoring circuit 203 receives the output of the coding circuit 202, and monitors the amount of downlink traffic in the same manner as does the uplink traffic monitoring circuit 194. The monitored amount of downlink traffic is supplied to the uplink/downlink-ratio and uplink/downlink-channel-number computation circuit 195. The uplink/downlink-ratio and uplink/downlink-channel-number computation circuit 195 performs operation as follows:

(1) obtaining an uplink immediately preceding ratio and a downlink immediately preceding ratio;

(2) retrieving an empirical ratio from the empirical ratio memory 196 to obtain a current ratio;

(3) obtaining the numbers of uplink slots and downlink slots according to the current ratio, and supplies the obtained numbers to the reporting control circuit 198; and (4) updating empirical ratios. That is, empirical ratios are retrieved from the empirical ratio memory 196 at predetermined intervals, and weighted averages of the empirical ratios and immediately preceding ratios are obtained by weighting respective ratios according to the numbers of samples, followed by storing the obtained averages as new empirical ratios in the empirical ratio memory 196.

The numbers of uplink slots and downlink slots obtained by the uplink/downlink-ratio and uplink/downlink-channel-number computation circuit 195 are supplied to the signal multiplexing circuit 201 via the reporting control circuit 198. These signals input into the signal multiplexing circuit 201 are multiplexed by the signal multiplexing circuit 201 with the downlink information supplied from the coding circuit 202. The multiplexed signals are then transmitted to the mobile station via the modulator circuit 200 and the circulator 190.

In the first and second embodiments, updating of empirical ratios is performed by obtaining weighted averages of empirical ratios and immediately preceding ratios by weighting respective ratios according to the numbers of samples. Alternatively, weighted averages of empirical ratios and current ratios may be obtained by weighting respective ratios according to the numbers of samples.

In the first and second embodiments, there may be a case in which communication quality required for the uplink and the downlink are not satisfied after allocating channels or time slots to the uplink and the downlink through various computation and data processing. In such a case, the base station may reallocate transmission power by boosting transmission power of uplinks and downlinks of its own cell or reducing transmission power of uplinks and downlinks of other cells. This makes it possible to reduce a bit-error rate and attain high-speed transfer, thereby satisfying the required communication quality.

Further, there may be a case in which actual communication quality far exceeds the communication quality required for the uplink and the downlink after allocating channels or time slots to the uplink and the downlink through various computation and data processing. This may present a risk of squandering system capacity. To prevent an excessive reduction in available system capacity, the base station reallocates transmission power by reducing the transmission power of uplinks and downlinks of its own cell, for example.

In the embodiments described above, the radio resources of the uplink and the downlink are not fixed, but are allocated in proportion to the ratio between the actual uplink traffic and the actual downlink traffic, or in proportion to the current ratio between the uplink and the downlink that is computed from an empirical ratio and an immediately preceding ratio to properly modify the ratio between the actual uplink traffic and the actual downlink traffic. Accordingly, traffic that varies with time and exhibits asymmetry can be efficiently accommodated, thereby providing a method of allocating radio resources in a stable manner.

Further, the present invention is not limited to these embodiments, but various variations and modifications may be made without departing from the scope of the present invention.

The present application is based on Japanese priority application No. 2000-302636 filed on Oct. 2, 2000, with the Japanese Patent Office, the entire contents of which are hereby incorporated by reference.

What is claimed is:

1. A method of allocating radio resources, in a base station, to the base station and a mobile station, comprising:
    obtaining a ratio between traffic of an uplink and traffic of a downlink;
    allocating the radio resources to the uplink and the downlink for the mobile station; and
    dividing time into a plurality of time periods corresponding to at least one of days of a week and hours of a day, and allocating empirical data regarding the traffic of the uplink and the traffic of the downlink to the respective time periods, wherein said obtaining the ratio includes;
    obtaining a current ratio between the traffic of the uplink and the traffic of the downlink based on current traffic; and
    obtaining a weighted average of the empirical data corresponding to a present time period and the current ratio by weighting the empirical data and the current ratio with respective weighting factors that are determined on a base-station specific basis depending on volatility of traffic, wherein said allocating the radio resources allocates the radio resources to the uplink and the downlink according to the weighted average.

2. The method as claimed in claim 1, further comprising transmitting, to the mobile station, information about the radio resources with respect to at least one of the uplink and the downlink.

3. The method as claimed in claim 1, further comprising allocating transmission power according to communication quality required for the uplink and the downlink.

4. A base station apparatus which communicates with a mobile station apparatus, comprising:
    a computation unit which obtains a ratio between traffic of an uplink and traffic of a downlink; and
    an allocation unit which allocates radio resources to the uplink and the downlink according to the ratio, wherein time is divided into a plurality of time periods corresponding to at least one of days of a week and hours of a day, and empirical data regarding the traffic of the uplink and the traffic of the downlink are allocated to the respective time periods, wherein said computation unit obtains a current ratio between the traffic of the uplink and the traffic of the downlink based on current traffic, and obtains a weighted average of the empirical data corresponding to a present time period and the current ratio by weighting the empirical data and the current ratio with respective weighting factors that are determined on a base-station-specific basis depending on volatility of traffic, and wherein said allocation unit allocates the radio resources to the unlink and the downlink according to the weighted average.

5. The base station apparatus method as claimed in claim 4, further comprising a reporting control unit which transmits, to the mobile station, information about the radio resources with respect to at least one of the uplink and the downlink.

6. The base station apparatus method as claimed in claim 4, wherein the allocation unit allocates transmission power according to communication quality required for the uplink and the downlink.

* * * * *